(12) United States Patent
Park

(10) Patent No.: US 12,136,420 B2
(45) Date of Patent: Nov. 5, 2024

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Jaeseok Park, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 328 days.

(21) Appl. No.: 17/517,466

(22) Filed: Nov. 2, 2021

(65) Prior Publication Data

US 2022/0139390 A1     May 5, 2022

(30) Foreign Application Priority Data

Nov. 3, 2020     (KR) .................. 10-2020-0145026

(51) Int. Cl.
*G10L 15/22*     (2006.01)
*G01C 21/36*     (2006.01)
*G06F 40/166*     (2020.01)
*G06F 40/295*     (2020.01)
(Continued)

(52) U.S. Cl.
CPC .......... *G10L 15/22* (2013.01); *G01C 21/3608* (2013.01); *G01C 21/3629* (2013.01); *G06F 40/166* (2020.01); *G06F 40/295* (2020.01); *G10L 15/18* (2013.01); *G10L 15/30* (2013.01); *G10L 2015/223* (2013.01)

(58) Field of Classification Search
CPC ... G10L 15/22; G10L 2015/223; G10L 15/18; G10L 15/30; G01C 21/3629; G06F 40/295; G06F 40/166
See application file for complete search history.

(56) References Cited

U.S. PATENT DOCUMENTS 5,055,939 A * 10/1991 Karamon ............... G11B 27/10
                                                                    386/338
6,243,683 B1 * 6/2001 Peters ..................... G10L 15/24
                                                                    704/273

(Continued)

FOREIGN PATENT DOCUMENTS

AU     2005292243 A1 * 5/2007 ........... G01C 21/005
AU     2008357168 A1 * 10/2010 ......... G01C 21/3629
(Continued)

*Primary Examiner* — Mohammad K Islam
(74) *Attorney, Agent, or Firm* — Lempia Summerfield Katz LLC

(57) ABSTRACT

The present disclosure is related to a vehicle capable of outputting a sensible response voice in response to an utterance command of a user. The vehicle includes a voice processor configured to convert an utterance command of a user into text information and recognize a domain and an named entity corresponding to the utterance command based on the text information; a database configured to store answer text corresponding to the domain and the named entity; a speaker; and a controller configured to receive information corresponding to the domain and the named entity, correct the answer text stored in the database based on the information corresponding to the domain and the named entity, and control the speaker to output the corrected answer text.

14 Claims, 5 Drawing Sheets

(51) Int. Cl.
*G10L 15/18* (2013.01)
*G10L 15/30* (2013.01)

(56) References Cited

U.S. PATENT DOCUMENTS

| | | | | |
|---|---|---|---|---|
| 6,567,775 | B1* | 5/2003 | Maali | G06V 20/40 |
| | | | | 704/231 |
| 7,472,063 | B2* | 12/2008 | Nefian | G06F 18/256 |
| | | | | 704/256.1 |
| 7,957,542 | B2* | 6/2011 | Sarrukh | G10K 11/341 |
| | | | | 704/226 |
| 8,700,392 | B1* | 4/2014 | Hart | G10L 15/25 |
| | | | | 704/231 |
| 8,913,103 | B1* | 12/2014 | Sargin | G06V 40/16 |
| | | | | 348/14.12 |
| 9,832,583 | B2* | 11/2017 | Cohen | H04M 3/568 |
| 9,881,610 | B2* | 1/2018 | Connell | G10L 15/25 |
| 9,922,646 | B1* | 3/2018 | Blanksteen | G06F 3/167 |
| 10,154,361 | B2* | 12/2018 | Tammi | H04S 7/30 |
| 10,332,515 | B2* | 6/2019 | Kim | G10L 25/78 |
| 10,374,816 | B1* | 8/2019 | Leblang | H04L 12/1822 |
| 11,789,457 | B1* | 10/2023 | Woo | G05D 1/0255 |
| | | | | 700/253 |
| 2004/0220705 | A1* | 11/2004 | Basir | B60R 21/01538 |
| | | | | 701/1 |
| 2009/0015651 | A1* | 1/2009 | Togami | G10L 21/00 |
| | | | | 348/14.01 |
| 2009/0055180 | A1* | 2/2009 | Coon | B60R 16/0373 |
| | | | | 704/251 |
| 2009/0150149 | A1* | 6/2009 | Culter | G06F 18/256 |
| | | | | 704/201 |
| 2010/0194863 | A1* | 8/2010 | Lopes | G06T 7/12 |
| | | | | 715/848 |
| 2010/0265164 | A1* | 10/2010 | Okuno | H04S 7/304 |
| | | | | 345/8 |
| 2011/0224978 | A1* | 9/2011 | Sawada | G06V 40/16 |
| | | | | 704/E15.001 |
| 2012/0069131 | A1* | 3/2012 | Abelow | G06Q 30/0601 |
| | | | | 345/589 |
| 2013/0030811 | A1* | 1/2013 | Olleon | B60K 35/00 |
| | | | | 348/148 |
| 2013/0169801 | A1* | 7/2013 | Martin | G06T 7/80 |
| | | | | 348/222.1 |
| 2014/0187219 | A1* | 7/2014 | Yang | H04W 4/023 |
| | | | | 455/418 |
| 2014/0214424 | A1* | 7/2014 | Wang | G06V 40/172 |
| | | | | 704/246 |
| 2014/0365228 | A1* | 12/2014 | Ng-Thow-Hing | G06F 3/017 |
| | | | | 704/275 |
| 2014/0372100 | A1* | 12/2014 | Jeong | G06T 13/40 |
| | | | | 704/2 |
| 2015/0023256 | A1* | 1/2015 | Liu | H04W 4/40 |
| | | | | 370/329 |
| 2015/0058004 | A1* | 2/2015 | Dimitriadis | G10L 25/78 |
| | | | | 704/233 |
| 2015/0112593 | A1* | 4/2015 | Kandangath | G01C 21/3644 |
| | | | | 701/400 |
| 2015/0139426 | A1* | 5/2015 | Tammi | H04R 3/005 |
| | | | | 381/17 |
| 2015/0154957 | A1* | 6/2015 | Nakadai | G10L 15/26 |
| | | | | 704/235 |
| 2015/0254058 | A1* | 9/2015 | Klein | G10L 15/22 |
| | | | | 704/275 |
| 2015/0324636 | A1* | 11/2015 | Bentley | A63F 13/212 |
| | | | | 386/227 |
| 2015/0340040 | A1* | 11/2015 | Mun | G10L 17/22 |
| | | | | 704/246 |
| 2016/0061617 | A1* | 3/2016 | Duggan | G06F 16/24578 |
| | | | | 701/538 |
| 2016/0064000 | A1* | 3/2016 | Mizumoto | G10L 17/02 |
| | | | | 704/233 |
| 2016/0100092 | A1* | 4/2016 | Bohac | H04N 7/188 |
| | | | | 382/103 |
| 2016/0140964 | A1* | 5/2016 | Connell | G10L 15/07 |
| | | | | 704/231 |
| 2016/0358604 | A1* | 12/2016 | Dreuw | G10L 15/22 |
| 2017/0113627 | A1* | 4/2017 | Ding | B60R 1/12 |
| 2017/0133036 | A1* | 5/2017 | Cohen | H04N 7/147 |
| 2017/0309275 | A1* | 10/2017 | Takayanagi | G10L 15/32 |
| 2017/0309289 | A1* | 10/2017 | Eronen | H04R 1/406 |
| 2017/0351485 | A1* | 12/2017 | Kohler | G06F 3/165 |
| 2018/0018964 | A1* | 1/2018 | Reilly | G10L 15/02 |
| 2018/0033447 | A1* | 2/2018 | Ramprashad | G10L 25/21 |
| 2018/0077492 | A1* | 3/2018 | Yamada | H04R 3/12 |
| 2018/0174583 | A1* | 6/2018 | Zhao | G10L 25/78 |
| 2018/0190272 | A1* | 7/2018 | Georges | G10L 25/54 |
| 2018/0190282 | A1* | 7/2018 | Mohammad | G10K 11/178 |
| 2018/0233147 | A1* | 8/2018 | Tukka | G06F 3/167 |
| 2018/0286404 | A1* | 10/2018 | Cech | G06T 7/254 |
| 2019/0037363 | A1* | 1/2019 | Tzirkel-Hancock | H04W 4/48 |
| 2019/0051287 | A1* | 2/2019 | Nomura | G06Q 30/0269 |
| 2019/0073999 | A1* | 3/2019 | Prémont | G10L 15/08 |
| 2019/0237067 | A1* | 8/2019 | Friedman | G10L 15/08 |
| 2019/0333508 | A1* | 10/2019 | Rao | G10L 15/25 |
| 2019/0355352 | A1* | 11/2019 | Kane | G06V 20/59 |
| 2019/0394339 | A1* | 12/2019 | Seo | H04R 1/1083 |
| 2020/0191595 | A1* | 6/2020 | Chipouras | G01C 21/3655 |
| 2020/0294092 | A1* | 9/2020 | Tong | G06F 3/147 |
| 2021/0199458 | A1* | 7/2021 | Aggarwal | G06F 40/30 |
| 2021/0318125 | A1* | 10/2021 | Ahmed | G01C 21/3407 |
| 2023/0401274 | A1* | 12/2023 | Denninghoff | G06Q 30/0251 |

FOREIGN PATENT DOCUMENTS

| | | | | |
|---|---|---|---|---|
| AU | 2010246465 | A1* | 8/2011 | G01C 21/3629 |
| CN | 102117221 | A* | 7/2011 | G06F 3/165 |
| CN | 116734836 | A* | 9/2023 | G01C 21/3423 |
| DE | 102013004444 | A1* | 9/2014 | B60Q 1/38 |
| DE | 202016106975 | U1* | 6/2017 | G01C 21/3415 |
| DE | 202017106586 | U1* | 7/2018 | G06K 9/00255 |
| JP | 3639412 | B2* | 4/2005 | G01C 21/3626 |
| JP | 3902483 | B2* | 4/2007 | G01C 21/3608 |
| JP | 4093773 | B2* | 6/2008 | G01C 21/36 |
| JP | 4348852 | B2* | 10/2009 | G01C 21/00 |
| JP | 4584434 | B2* | 11/2010 | G01C 21/3629 |
| JP | 4993648 | B2* | 8/2012 | G01C 21/00 |
| KR | 20100003951 | A* | 7/2008 | G06F 3/167 |
| WO | WO-2017138934 | A1* | 8/2017 | G10L 15/08 |
| WO | WO-2020050841 | A1* | 3/2020 | G01C 21/343 |

* cited by examiner

VEHICLE AND METHOD OF CONTROLLING THE SAME

CROSS-REFERENCE TO RELATED APPLICATION

The present application claims priority to Korean Patent Application No. 10-2020-0145026, filed on Nov. 3, 2020 in the Korean Intellectual Property Office, the entire contents of which are incorporated herein for all purposes by this reference.

BACKGROUND

1. Technical Field

The present disclosure relates to a vehicle capable of exchanging a conversation with a user and a method for controlling thereof, and more particularly, to a vehicle capable of outputting a sensible response voice in response to a utterance command of a user and a method for controlling thereof.

2. Description of the Related Art

A voice recognition system is a system capable of recognizing an utterance of a user and providing a service corresponding to the recognized utterance.

Recently, various types of conversation services using the voice recognition system have been provided. In particular, various electronic devices of a vehicle can be controlled according to the intention of the occupant when an occupant inside the vehicle utters a command for controlling various electronic devices of the vehicle.

In addition, when an utterance command of the occupant is input, the vehicle notifies the occupant of whether the command is recognized by outputting a response voice in response to the utterance command.

However, the response voice of the vehicle in response to the utterance command of the occupant is a text mapped to a database according to each command converted into a voice, which may give the occupant a rather obvious and banal feeling.

SUMMARY

An object of the present disclosure is to provide a vehicle capable of outputting a more sensible response voice in response to an utterance command of a user and a method for controlling thereof.

It is one aspect of the present disclosure to provide a vehicle including a voice processor configured to convert an utterance command of a user into text information and recognize a domain and a named entity corresponding to the utterance command based on the text information. The vehicle also includes a database configured to store answer text corresponding to the domain and the named entity. The vehicle also includes a speaker and a controller, where the controller is configured to receive information corresponding to the domain and the named entity, correct the answer text stored in the database based on the information corresponding to the domain and the named entity, and control the speaker to output the corrected answer text.

When the domain is a navigation device and the named entity is a place name, the information corresponding to the domain and the named entity may include at least one of destination setting history information for the named entity, category information of the named entity, location information of a place having the named entity, location information of the vehicle, or current time information.

The controller may correct the answer text stored in the database to include a phrase associated with a period between a time at which the named entity is set as a destination and an input time of the utterance command.

The controller may correct the answer text stored in the database to include a phrase associated with the category information of the named entity.

When the vehicle is located within a preset distance from a first preset place and the place having the named entity corresponds to a second preset place, the controller may correct the answer text stored in the database to include a preset phrase corresponding to the first preset place and the second preset place.

The controller may correct the answer text stored in the database to include a preset phrase corresponding to the current time information.

When the domain is a mobile communication device and the named entity is a name indicating a family, the information corresponding to the domain and the named entity may include information on a plurality of modifiers for modifying the named entity. The controller may correct the answer text stored in the database to include any one modifier among the plurality of modifiers.

When the domain is a vehicle control system and the named entity is a name indicating a control target device, the information corresponding to the domain and the named entity may include at least one of weather information or activation information of a vehicle system.

When a condition for operating the control target device and the weather information do not match or the condition and the activation information of the vehicle system do not match, the controller may correct the answer text to be changed to an interrogative sentence including a first phrase associated with the weather information or a second phrase associated with the activation information of the vehicle system.

The vehicle may further include a communicator configured to transmit a control command to the control target device. The controller may control the communicator to transmit a control command corresponding to the utterance command to the control target device only when the condition for operating the control target device and the weather information match or the condition and the activation information of the vehicle system match.

It is another aspect of the disclosure to provide a method of controlling a vehicle, the method including converting an utterance command of a user into text information and recognizing a domain and a named entity corresponding to the utterance command based on the text information. The method of controlling the vehicle also includes receiving information corresponding to the domain and the named entity. The method of controlling the vehicle also includes correcting answer text stored in a database based on the information corresponding to the domain and the named entity. The method of controlling the vehicle also includes controlling a speaker to output the corrected answer text.

When the domain is a navigation device and the named entity is a place name, the information corresponding to the domain and the named entity may include at least one of destination setting history information for the named entity, category information of the named entity, location information of a place having the named entity, location information of the vehicle, or current time information.

The correcting of answer text stored in the database based on the information corresponding to the domain and the named entity may include correcting the answer text stored in the database to include a phrase associated with a period between a time at which the named entity is set as a destination and an input time of the utterance command.

The correcting of answer text stored in the database based on the information corresponding to the domain and the named entity may include correcting the answer text stored in the database to include a phrase associated with the category information of the named entity.

When the vehicle is located within a preset distance from a first preset place and the place having the named entity corresponds to a second preset place, the correcting of answer text stored in the database based on the information corresponding to the domain and the named entity may include correcting the answer text stored in the database to include a preset phrase corresponding to the first preset place and the second preset place.

The correcting of answer text stored in the database based on the information corresponding to the domain and the named entity may include correcting the answer text stored in the database to include a preset phrase corresponding to the current time information.

When the domain is a mobile communication device and the named entity is a name indicating a family, the information corresponding to the domain and the named entity may include information on a plurality of modifiers for modifying the named entity. The correcting of answer text stored in the database based on the information corresponding to the domain and the named entity may include correcting the answer text stored in the database to include any one modifier among the plurality of modifiers.

When the domain is a vehicle control system and the named entity is a name indicating a control target device, the information corresponding to the domain and the named entity may include at least one of weather information or activation information of a vehicle system.

When a condition for operating the control target device and the weather information do not match or the condition and the activation information of the vehicle system do not match, the correcting of answer text stored in the database based on the information corresponding to the domain and the named entity may include correcting the answer text to be changed to an interrogative sentence including a first phrase associated with the weather information or a second phrase associated with the activation information of the vehicle system.

The method for controlling the vehicle may further include transmitting a control command corresponding to the utterance command to the control target device only when the condition for operating the control target device and the weather information match or the condition and the activation information of the vehicle system match.

BRIEF DESCRIPTION OF THE DRAWINGS

These and/or other aspects of the present disclosure should become apparent and more readily appreciated from the following description of the embodiments, taken in conjunction with the accompanying drawings of which.

DETAILED DESCRIPTION

Figure 1:
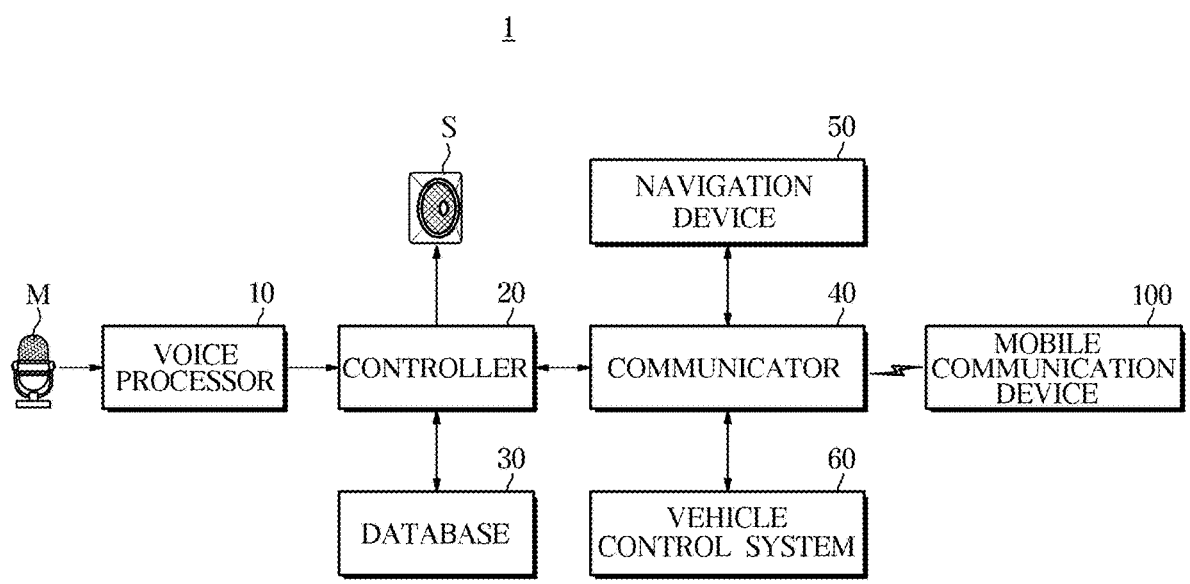
FIG. 1 is a control block diagram of a vehicle according to an embodiment.

Like reference numerals refer to like elements throughout the specification. Not all elements of the embodiments of the disclosure are described, and descriptions of what are commonly known in the art or what overlap each other in the embodiments have been omitted.

It should be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It should be further understood that the term "member" and its derivatives refer both to the situation where a member in contact with another member and the situation where another member exists between the two members.

It should be understood that the singular forms "an," and "the" include plural references unless the context clearly dictates otherwise.

Terms such as "~unit", "~group", "~block", "~member", and "~module" used in the specification may be implemented in software or hardware. Terms such as "~unit", "~group", "~block", "~member", and "~module" may refer to a unit that processes at least one function or operation. In addition, terms such as "~unit", "~group", "~block", "~member", and "~module" are used in at least one piece of hardware such as a field-programmable gate array (FPGA)/application specific integrated circuit (ASIC), or at least one software or processor stored in a memory. When a component, device, element, or the like of the present disclosure is described as having a purpose or performing an operation, function, or the like, the component, device, or element should be considered herein as being "configured to" meet that purpose or to perform that operation or function.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure are described with reference to accompanying drawings.

FIG. 1 is a control block diagram of a vehicle according to an embodiment.

Referring to FIG. 1, the vehicle 1 according to an embodiment includes a microphone M, a voice processor 10, a controller 20, a database 30, a speaker S, a communicator 40, a navigation device 50, and a vehicle control system 60.

The microphone M may receive an utterance command of a user and generate an electrical signal corresponding to the utterance command.

For this purpose, the microphone M may be disposed inside the vehicle 1 to receive a voice from in the vehicle 1, and a plurality of microphones may be used to receive the voices of all occupants.

The microphone M may convert the utterance command of the user into an electrical signal and transmit it to the voice processor 10.

The voice processor 10 may include a conversation manager that determines user intent included in the utterance command by analyzing a Speech to Text (STT) engine that converts the utterance command of the user input through the microphone M into text information, and text.

The conversation manager may grasp user intention corresponding to the utterance command by applying natural language understanding to text.

Specifically, the conversation manager converts an input string into a morpheme string by performing morpheme analysis on the utterance command in text form. Also, the conversation manager may identify a named entity from the utterance command. The named entity is a proper noun such as a person's name, a place name, an organization name, a time, a date, money, a name indicating a family, and the name of various electronic devices of the vehicle 1. Recognition of the named entity is the task of identifying a named entity in a sentence and determining the type of the identified named entity. The conversation manager may extract important keywords from the sentence through the recognition of the named entity and grasp the meaning of the sentence.

Also, the conversation manager may recognize a domain from the utterance command of the user. The domain may identify a subject of language uttered by the user, and for example, the type of device to be controlled may be the domain. Accordingly, the domain may be an electronic device inside the vehicle 1, such as the navigation device 50, the vehicle control system 60, or a mobile communication device 100 of the user. In addition, domains including various subjects such as text, navigation, schedule, weather, traffic, and vehicle control may be stored in the database 30.

The navigation device 50 may refer to any device for providing an optimal driving route to a user by receiving a destination input from a user and searching a route to reach the destination.

For example, the navigation device 50 may refer to an audio-video-navigation (AVN) device of the vehicle 1 and further may include an external terminal device including a navigation function.

In other words, although the mobile communication device 100 and the navigation device 50 are separately shown in FIG. 1, when the mobile communication device 100 performs a navigation function and performs short-range communication and/or long-range communication with the vehicle 1, the mobile communication device 100 may also be an example of the navigation device 50.

The mobile communication device 100 may refer to any device capable of performing short-range communication and/or lona-range communication with the vehicle 1. For example, the mobile communication device 100 may include a smart phone.

The vehicle control system 60 may mean a plurality of control devices capable of driving various electronic devices of the vehicle 1. For example, the vehicle control system 60 may include an air conditioner control device for driving an air conditioner of the vehicle 1, a window control device for opening and closing a window of the vehicle 1, a mode activation system for activating/deactivating a vehicle system such as a rear seat conversation mode and a rear seat sleeping mode, and the like.

The rear seat conversation mode is a mode in which the driver and rear seat occupant communicate using a microphone provided in a driver's seat of the vehicle 1 and a speaker provided in the rear seat. The rear seat sleeping mode is a mode in which the rear seat occupant sleeps by turning off the speaker provided in the rear seat.

The conversation manager can analyze a dialog act of a speech act of the user. Speech act analysis is the task of analyzing an intention of the utterance of the user. The purpose of the speech act analysis is to understand the intention of the utterance, such as whether the user asks a question, makes a request, responds, or expresses a simple emotion.

The conversation manager may identify the intention of the user based on information such as a domain, a named entity, and a speech act corresponding to the utterance command of the user and may extract an action corresponding to the intention of the user.

For example, when the identified intention of the user is [Air conditioner execution], the corresponding action may be defined as 'Air conditioner (object)_ON (operator).' When the identified intention of the user is [window opening], the corresponding action may be defined as 'window (object)_OPEN (operator)'.

The controller 20 may transmit a control signal to the vehicle control system 60 through the communicator 40 or transmit a control signal to the navigation device 50 through the communicator 40 based on various information received from the voice processor 10.

For example, when the controller 20 receives action data such as 'Air conditioner execution' from the voice processor 10, the controller 20 may transmit a control signal for turning on the air conditioner to the air conditioner control device.

In addition, the controller 20 may convert the answer text corresponding to the domain and the named entity into a voice signal and control the speaker S to output the answer text based on domain data and named entity data received from the voice processor 10. For this purpose, the speaker S may mean any device capable of outputting a voice (i.e., audio output) based on a voice signal and may be provided at a position where the occupant inside the vehicle 1 may listen to the outputted voice without limitation in number.

The controller 20 may include a Text to Speech (TTS) engine to convert the answer text into the voice signal. The TTS engine may convert the answer text into the voice signal, and the controller 20 may deliver the voice signal to the speaker S.

The database 30 may store answer text corresponding to each of a plurality of domains and a plurality of named entities or a combination thereof.

For example, the database 30 may store a text "I will guide you to A" as the answer text corresponding to a domain such as 'request for route guidance through the navigation device 50', and a named entity such as 'a specific place name (for example, A)'.

As another example, the database 30 may store a text "I will call A" as the answer text corresponding to a domain such as 'call request through the mobile communication device 100' and a named entity such as 'a specific person name (for example, A)'.

As another example, the database 30 may store a text "I will share the location of my car with A" as the answer text corresponding to a domain such as 'request to share current location through mobile communication device 100' and a named entity such as 'a specific person name (for example, A)'.

As another example, the database 30 may store a text "I will turn on the air conditioner" as the answer text corresponding to a domain such as 'execution of the electronic device through the vehicle control system 60' and a named entity such as 'air conditioner'.

As another example, the database 30 may store a text "I will turn on the rear seat conversation mode" as the answer text corresponding to a domain such as 'activation of the vehicle system through the vehicle control system 60' and a named entity such as rear seat conversation'.

Upon receiving the domain and the named entity from the voice processor 10, the controller 20 may request information corresponding to the domain and the named entity through the communicator 40.

When the domain is the navigation device 50 and the named entity is a place name, information corresponding to the domain and the named entity may include at least one of destination setting history information for the named entity, category information of the named entity, location information of a place having the named entity, or location information or current time information of the vehicle 1.

In this case, the controller 20 may receive at least one of the information among the above-described information from the navigation device 50 through the communicator 40 and may receive at least one of the information among the above-described information through an external server.

In addition, when the domain is the mobile communication device 100 and the named entity is a name indicating a family, the information corresponding to the domain and the named entity may include information on a plurality of modifiers for modifying the named entity.

In this case, a plurality of modifiers for modifying the named entity may be stored in the database 30, and the controller 20 may receive information on the plurality of modifiers from the database 30.

In addition, when the domain is the vehicle control system 60 and the named entity is a name indicating a control target device, the information corresponding to the domain and the named entity may include at least one of weather information or activation information of a vehicle system.

The controller 20 may receive at least one of the information among the above-described information from the vehicle control system 60 through the communicator 40 and may receive at least one of the information among the above-described information through an external server.

When the controller 20 receives information corresponding to the domain and the named entity, the speaker S may be controlled to correct the answer text stored in the database 30 based on information corresponding to the domain and the named entity and may be controlled to output the corrected answer text.

The vehicle 1 according to an embodiment may include at least one memory for storing a program and related data for performing the above-described operation and an operation to be described below and may include at least one processor for executing the stored program.

It is also possible for the voice processor 10 and the controller 20 to use a separate memory and processor, respectively, and it is also possible for some or all of them to share the memory and the processor.

In addition, it is also possible for the TTS engine of the controller 20 to use a separate memory and processor.

In addition, the database 30 may include a non-volatile memory such as Read Only Memory (ROM), Erasable Programmable Read Only Memory (EPROM), Electrically Erasable Programmable Read Only Memory (EEPROM), flash memory and the like, and a volatile memory such as Static Random Access Memory (S-RAM), Dynamic Random Access Memory (D-RAM) and the like. Depending on the type of information to be stored, it may be stored in a non-volatile memory or a volatile memory.

The communicator 40 according to an embodiment may include a vehicle communication network for communicating with various electronic devices in the vehicle 1 and/or short-range communication module for communicating with the mobile communication device 100 and/or external server and/or a long-range communication module for communicating with the mobile communication device 100.

For example, the communicator 40 may exchange various data/commands with the navigation device 50 and the vehicle control system 60 through the vehicle communication network.

The vehicle communication network may adopt communication methods such as Ethernet, Media Oriented Systems Transport (MOST), Flexray, Controller Area Network (CAN), Local Interconnect Network (LIN) and the like.

The long-range communication module may include at least one of various wireless communication modules for connecting to the Internet network in a wireless communication method, such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), 4G mobile communication, 5G mobile communication, and the like in addition to Wifi and Wireless broadband (WiBro).

The short-range communication module may include at least one of various short-range communication modules for transmitting and receiving signals using a wireless communication network in a short-range, such as bluetooth module, infrared communication module, Radio Frequency Identification (RFID) communication module, Wireless Local Access Network (WLAN) communication module, NFC communication module, Zigbee communication module, Z-Wave communication module, Wi-Fi direct communication module and the like.

In addition, the communicator 40 may include an antenna for transmitting a radio signal to or receiving a radio signal from free space, a modulator/demodulator for modulating data to be transmitted or demodulating a received radio signal, and the like.

The controller 20 may directly exchange data/commands with the navigation device 50 and the vehicle control system 60 without going through the communicator 40 and may exchange data/commands with the speaker S through the communicator 40.

In the above, various components of the vehicle 1 have been described. Hereinafter, a control method of the vehicle 1 using the components of the vehicle 1 described above with reference to FIGS. 2-5 is described.

Figure 2:
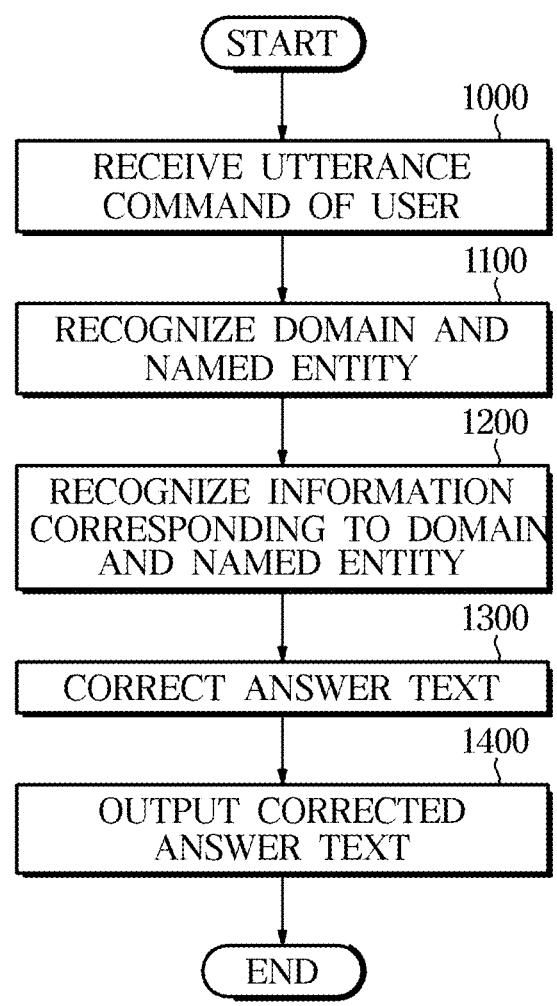
FIG. 2 is a flowchart of a method for controlling a vehicle according to an embodiment.

FIG. 2 is a flowchart of a method for controlling vehicle according to an embodiment.

Referring to FIG. 2, the microphone M may receive an utterance command of the user, convert the received utterance command into an electrical signal, and transmit the received utterance command to the voice processor 10. In other words, the voice processor 10 may receive the utterance command of the user in the form of an electrical signal from the microphone M (1000).

The voice processor 10 may convert the utterance command of the user into text information and recognize a domain and a named entity corresponding to the utterance command based on the text information (1100).

For example, when the utterance command of the user is 'Guide me to Gangnam Station', the voice processor 10 may extract 'navigation device 50' as the domain and extract 'Gangnam Station' as the named entity.

The voice processor 10 may transmit information about the domain and the named entity to the controller 20, and the controller 20 may request information about the domain and the named entity from various electronic devices of the vehicle 1 or an external server.

Thereafter, the controller 20 may receive information about the domain and the named entity (1200) and may correct an answer text stored in the database 30 based on information corresponding to the domain and the named entity (1300).

For example, the controller 20 may add a specific phrase to the answer text stored in the database 30 or delete a specific phrase and further correct a sentence form of the answer text.

For example, in some cases, the controller 20 may correct the answer text that is not a question type into a sentence of a question type.

The information corresponding to the domain and the named entity is described below in detail with reference to FIGS. 3-5.

The controller 20 may convert the corrected answer text into a voice signal and transmit the voice signal to the speaker S.

In other words, the controller 20 may control the speaker S to output the corrected answer text in the form of a voice (i.e., audio) response (1400).

Hereinafter, various embodiments in which the controller 20 corrects the answer text are described in detail.

Figure 3:
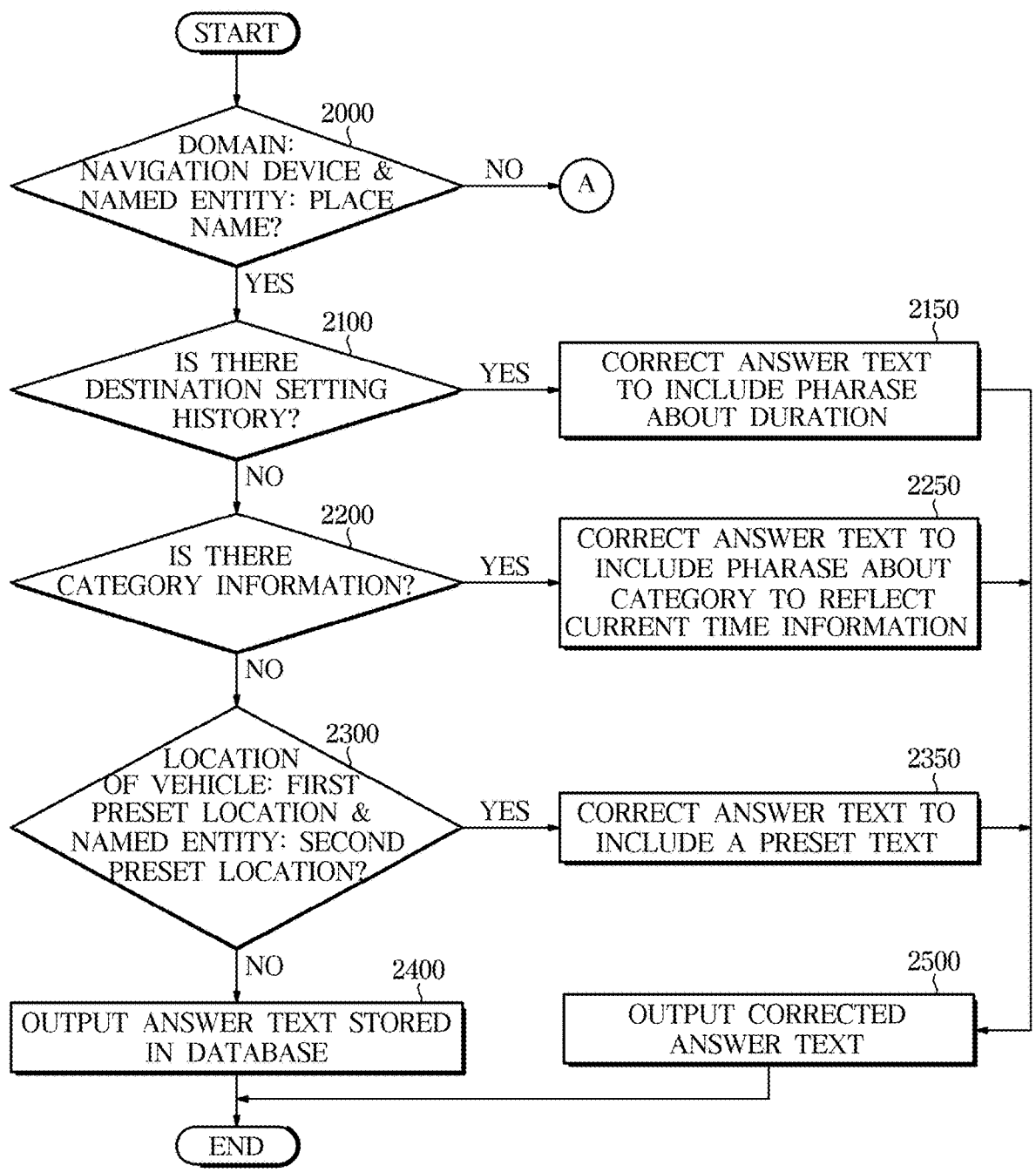
FIG. 3 is a flowchart of a method for controlling a vehicle when a user inputs an utterance command to control a navigation device.

FIG. 3 is a flowchart of a method for controlling a vehicle when a user inputs an utterance command to control a navigation device.

Referring to FIG. 3, when the domain is the navigation device 50 and the named entity corresponds to the place name based on the information received from the voice processor 10 (Yes of 2000), the controller 20 may request at least one of destination setting history information for the named entity from the navigation device 50 and/or an external server (2100), category information of the named entity (2200), location information of a place with the named entity and location information (2300), or current time information of the vehicle 1.

As an example, the voice processor 10 may recognize a domain such as 'navigation device 50' and a named entity such as 'Gangnam Station' by processing an utterance command of the user such as "Guide me to Gangnam Station". As another example, the voice processor 10 may recognize a domain such as 'navigation device 50' and a named entity such as 'home' by processing an utterance command of the user such as "our house".

The destination setting history information is information about the history of setting a destination for the named entity and may include information on the time and/or the number of times the destination is set for the named entity.

The category information is information about a category of the named entity and is information indicating which category the place with the named entity belongs to among various categories such as restaurants, cafes, car centers, banks, marts, pharmacies, gas stations, cafes, convenience stores, movie theaters, amusement parks, camping sites, subway stations, and the like.

For example, when the domain is the navigation device 50 and the named entity is Gangnam Station, the controller 20 may request at least one of destination setting history information for Gangnam Station, category information of Gangnam Station, location information of Gangnam Station, or current time information from the navigation device 50 and/or an external server.

When a destination setting history for the named entity exists (Yes of 2100), the controller 20 may correct the answer text stored in the database 30 to include a phrase associated with the period between the time at which the named entity is set as a destination and a input time of the utterance command (2150).

For example, when the time of setting the named entity as a destination is 2020/07/04 and the input time of the utterance command is 2020/09/07, the controller 20 may correct the answer text stored in the database 30 to include the phrase "two months".

For example, when the answer text stored in the database 30 is "I will guide you to [named entity]", the controller 20 may correct the answer text to "You are going in about [two months], I will guide you right away".

As another example, when the number of times the named entity is set as the destination is on the increase, the controller 20 responds with the answer text "[These days] you [often] go to [named entity]. I will guide you right away".

When the category information for a named entity exists (example of Yes of 2200), the controller 20 may correct the answer text stored in the database 30 to include a phrase associated with category information of the named entity, and in this case, the answer text may be corrected by reflecting the current time information (2250).

For example, when the category of the named entity is a restaurant, the controller 20 may correct the answer text to include a phrase "restaurant", which is a phrase related to the restaurant.

As an example, when the answer text stored in the database 30 is "I will guide you to [named entity]", the controller 20 may correct the answer text to "Isn't this a famous [restaurant]? I will guide you right away".

In this case, the controller 20 may correct the answer text stored in the database 30 to include a preset phrase corresponding to the current time information.

For example, when current time is between 11 am and 3 pm, the controller 20 may correct the answer text to include a preset phrase related to "lunch".

For example, when the category of the named entity is a restaurant and the current time is between 11 am and 3 pm, the controller 20 may correct the answer text "is there a famous [restaurant]? Have a delicious [Lunch] meal".

When the vehicle 1 is located within a preset distance from a first preset place, and a place with the named entity corresponds to a second preset place (example of Yes of 2300), the controller 20 may correct the answer text stored in the database 30 to include a preset phrase corresponding to the first preset place and the second preset place (2350).

The first preset place and the second preset place may include a place of interest input by the user to the navigation device 50.

For example, the first preset place may be set to 'work', and the second preset place may be set to 'home', and the phrases such as 'Thank you for your effort' and 'Thanks for doing a great job' may be stored as preset phrases corresponding to work and home.

The preset distance may be set to about 1 km, and when the vehicle 1 is a reasonable distance assumed to be in the vicinity of the first preset place, it may be employed without limitation.

For example, when the first preset place is a company and the second preset place is set as a home, when the vehicle 1 is located within 1 km from the 'company' and the place with the named entity corresponds to the 'home', the controller 20 may correct the answer text to "Thanks for doing a great job. I will guide you home immediately".

As described above, the controller 20 may control the speaker S to output the corrected answer text in the form of a voice response (2500).

When it does not correspond to the example described above, the controller 20 may control the speaker S to output the answer text stored in the database 30 (2400).

According to an embodiment of the present disclosure, when a user inputs an utterance command to the navigation device 50, various response voices may be provided according to various situations.

Figure 4:
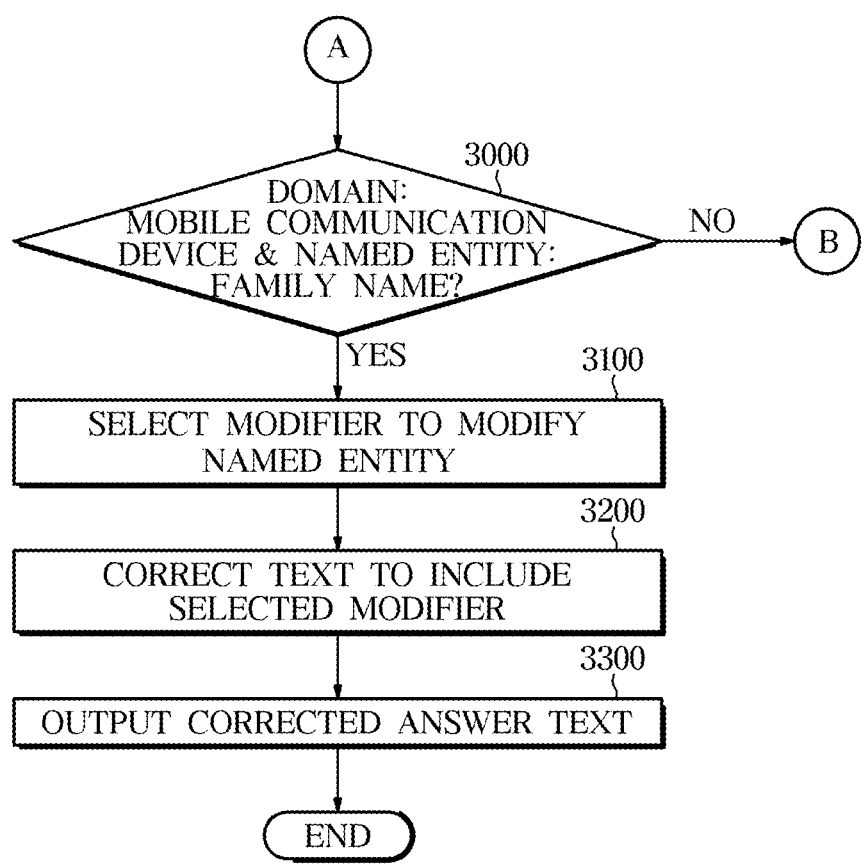
FIG. 4 is a flowchart of a method for controlling a vehicle when a user inputs an utterance command to control a mobile communication device.

FIG. 4 is a flowchart of a method for controlling a vehicle 1 when a user inputs an utterance command to control a mobile communication device.

Referring to FIG. 4, when the domain is the mobile communication device 100 and the named entity corresponds to the name indicating the family based on the information received from the voice processor 10 (example of Yes of 3000), the controller 20 may request information about a plurality of modifiers for modifying a named entity from an external server and/or a database 30 and/or a mobile communication device 100.

As an example, the voice processor 10 may recognize a domain such as 'mobile communication device 100' and a named entity such as 'mom' by processing an utterance command of the user such as "Call mom".

The names indicating family may include formal names such as "daughter, son, mom, dad, husband, wife", and the like, and informal names such as "madam, princess, prince, half, my love, honey, pretty", and the like.

In addition, when the domain is the mobile communication device 100, domains such as "telephone function, text function, car location sharing function" may be included as a more specific domain classification.

When the domain is classified as a phone function, the answer text stored in the database 30 may be "I will call [named entity]" and when the domain is classified as a character function, the answer text stored in the database 30 may be "I will text [named entity]." When the domain is a car location sharing function, the answer text stored in the database 30 may be "I will share the car location with [named entity]".

The external server and/or mobile communication device 100 and/or database 30 may transmit information about a plurality of modifiers corresponding to each of the family names to the controller 20, and the controller 20 may receive information on a plurality of modifiers and randomly select any one modifier from among the plurality of modifiers (3100).

For example, as a plurality of modifiers corresponding to "wife", there may be 'beloved', 'half of life', and the like, and the controller 20 may randomly select any one modifier from among the plurality of modifiers.

As another example, as a plurality of modifiers corresponding to "pretty", there may be 'my', 'treasure number 1', and the like, and the controller 20 may randomly select any one of the plurality of modifiers.

The controller 20 may modify the answer text stored in the database 30 to include any one of the plurality of modifiers (3200).

For example, when "wife" is included in the named entity and the domain is determined as "call through mobile communication device 100" the controller 20 may correct the answer text to "I will call my "beloved" wife."

Thereafter, the controller 20 may control the speaker S to output the corrected answer text in the form of a voice so that the modifier is included (3300).

According to an embodiment of the present disclosure, when a user inputs an utterance command for the mobile communication device 100, various response voices may be provided according to various names of persons.

Figure 5:
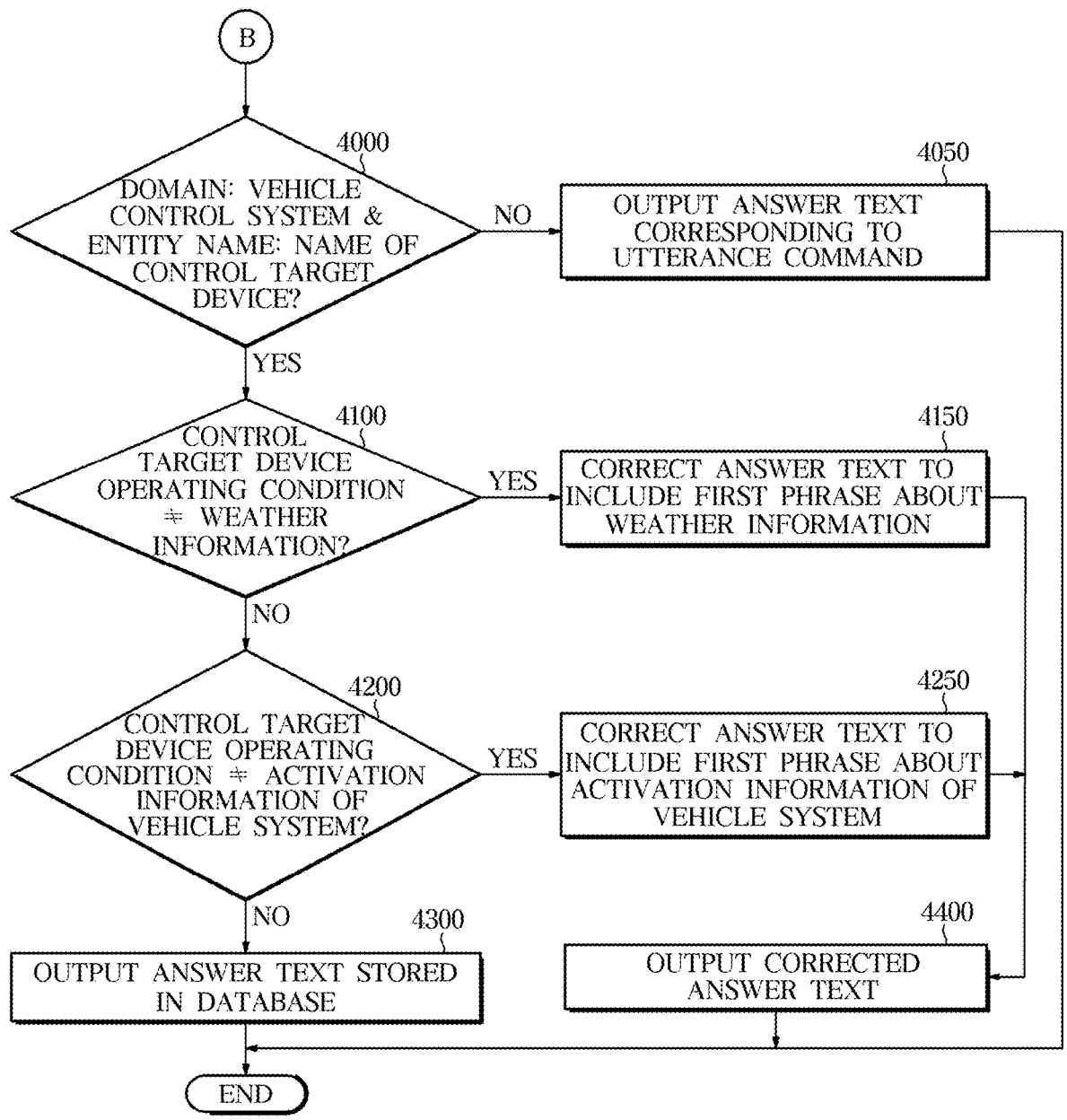
FIG. 5 is a flowchart of a method for controlling a vehicle when a user inputs an utterance command for controlling the vehicle control system.

FIG. 5 is a flowchart of a method for controlling a vehicle when a user inputs an utterance command for controlling the vehicle control system.

Referring to FIG. 5, when the domain is the vehicle control system 60 and the named entity does not correspond to the name indicating the control target device based on the information received from the voice processor 10 (No in 4000), the controller 20 may control the speaker S to output the answer text corresponding to the utterance command stored in the database 30 (4050).

In addition, even when operating conditions of the control target device matches the weather information (No in 4100) and also matches the activation information of the vehicle system (No in 4200), the controller 20 may control the speaker S to output the answer text corresponding to the utterance command stored in the database 30 (4300).

When the domain is the vehicle control system 60 and the named entity corresponds to the name indicating the control target device based on the information received from the voice processor 10 (example of Yes of 4000), the controller 20 may request information about at least one of the weather information (4100) and/or the activation information (4200) of the vehicle system from an external server and/or the vehicle control system 60.

For example, the voice processor 10 may recognize a domain such as 'vehicle control system 60' and a named entity such as 'window' by processing an utterance command of the user such as "open the window".

As described above, the vehicle control system 60 may mean an electronic control device for controlling various electronic devices of the vehicle 1, and the control target device may mean a target device controlled by the electronic control device.

For example, the vehicle control system 60 may be a 'window control device' for opening and closing a window or a 'sunroof control device' for opening and closing a sunroof, and the control target device may be a 'window' or a 'sunroof'.

The weather information may mean information on the weather of the current location of the vehicle 1 and may include various information such as fine dust information, humidity information, rainy weather information, and the like.

When the controller 20 does not match the conditions for operating the control target device and the weather information (example of Yes of 4100) the answer text stored in the database 30 may be modified to include a first phrase associated with weather information (4150).

In this case, the controller 20 may modify the answer text to a question type sentence.

The first phrase associated with the weather information may mean a phrase that may inform the user of the current weather information.

The conditions for operating the control target device may be stored in the database 30.

For example, in the database 30, a condition such as a 'normal state or good state of fine dust' may be stored as 'a condition for opening a window or a sunroof'.

In the database 30, the text "I will open the window" may be stored as an answer text corresponding to a named entity including "window" and a domain such as "opening a window through a window control device".

When the state of fine dust included in the weather information is in a bad state, the controller 20 may correct an answer text corresponding to a named entity including "window" and a domain such as "opening a window through a window control device" to "Currently, [fine dust], is in a bad state. Would you still like to [open the window?]".

When the operating conditions of the control target device and the activation information of the vehicle system do not match (Yes of 4200), the controller 20 may correct the answer text to include a second phrase associated with the activation information of the vehicle system (4250).

In this case, the controller 20 may correct the answer text to a question type sentence.

The activation information of the vehicle system may mean information on whether various modes provided in the vehicle 1 are activated. For example, the various modes provided in the vehicle 1 may mean various vehicle 1 modes such as 'rear seat conversation mode', 'rear seat sleeping mode', 'internal circulation mode', 'external air circulation mode' and the like.

In other words, the activation information of the vehicle system may include information on whether the current rear seat conversation mode is in an on state, whether the rear seat sleeping mode is in an on state, whether the internal circulation mode is in an on state, or whether the outdoor air circulation mode is in an on state.

The second phrase associated with the activation information of the vehicle system may mean a phrase that may inform the user of activation information of a current vehicle system.

The conditions for operating the control target device may be stored in the database 30.

As an example, the database 30 may store a condition of 'rear seat sleeping mode off state' as a 'condition for turning on the rear seat conversation mode'.

In the database 30, the text "I will turn on the rear seat conversation system" may be stored as an answer text corresponding to a named entity including a word such as "rear seat conversation" and a domain such as "operation of the back seat conversation system".

When the rear seat sleeping mode is on state, the controller 20 may correct the answer text corresponding to a named entity including "rear seat conversation" and a domain such as "operation of the back seat conversation system" to "Currently, [rear seat sleeping mode] is turned on. Would you still want to [change to rear seat conversation mode?]".

The controller 20 may control the speaker S so that the corrected answer text is output in a voice form (4400).

In addition, only when the conditions for operating the control target device and weather information match, or when the conditions for operating the control target device and the activation information of the vehicle system match, the communicator 40 may be controlled to transmit a control command corresponding to the utterance command to the control target device.

For example, when the rear seat conversion mode is in an on state, the controller 20 may not operate the rear seat conversation system in response to an utterance command of the user to turn on the rear seat conversation mode.

In other words, when it is determined that the operation of the control target device is inappropriate, the controller 20 may output an answer text asking the user for a sure intention in voice form and may suspend the transmission of the control command corresponding to the utterance command until receiving a clear intention of the user.

In addition, the controller 20 may determine the operating condition of the control target device in consideration of both the weather information and the activation information of the vehicle system. As an example, the database 30 may store a condition 'internal circulation mode is on state when the humidity is 80% or more' as an operating condition of the air conditioner.

When the user inputs an utterance command such as "Turn on the air conditioner" in a situation where the humidity is over 80% and the external air circulation mode is on state, the controller 20 may correct an answer text such as 'I will turn on the air conditioner' to 'Currently, the 'humidity' is very high. How about turning on the air conditioner and switching to [internal circulation mode]?'.

According to the vehicle 1 and the method of controlling the vehicle 1 according to an embodiment, convenience and interest can be provided to the user by outputting various response voices in consideration of the surrounding environment.

As is apparent from the above, according to the present disclosure, the usability of the voice recognition system can be improved by inducing interesting emotions of the occupant.

In addition, when the utterance command of the passenger is inappropriate, the intention of the utterance command of the user can be reconfirmed.

Examples of the vehicle and the method of controlling thereof are not limited thereto, and the embodiments described above are merely examples and representative in nature. Although the embodiments of the present disclosure have been described for illustrative purposes, those having ordinary skill in the art should appreciate that various modifications, additions, and substitutions are possible, without departing from the scope and spirit of the present disclosure. Therefore, embodiments of the present disclosure have not been described for limiting purposes.

What is claimed is:
1. A vehicle comprising:
a voice processor configured to convert an utterance command of a user into text information and recognize a domain and a named entity corresponding to the utterance command based on the text information;
a database configured to store answer text corresponding to the domain and the named entity;
a speaker;
a communicator configured to transmit a control command to the control target device; and
a processor configured to receive information corresponding to the domain and the named entity, correct the answer text stored in the database based on the information corresponding to the domain and the named entity, and control the speaker to output the corrected answer text,
wherein, when a number of times the named entity is set as a destination is increased, the processor is further configured to correct the answer text stored in the database to include a phrase associated with the number of times,
wherein when the domain is a vehicle control system and the named entity is a name indicating a control target device, the information corresponding to the domain and the named entity includes at least one of weather information or activation information of a vehicle system, and wherein when a condition for operating the control target device and the weather information do not match or the condition and the activation information of the vehicle system do not match, the processor is configured to correct the answer text to be changed to an interrogative sentence including a first phrase associated with the weather information or a second phrase associated with the activation information of the vehicle system, wherein the processor is configured to control the communicator to transmit a control command corresponding to the utterance command to the control target device only when a condition for operating the control target device and the weather information match or the condition and the activation information of the vehicle system match.

2. The vehicle according to claim 1, wherein when the domain is a navigation device and the named entity is a place name, the information corresponding to the domain and the named entity includes at least one of destination setting history information for the named entity, category information of the named entity, location information of a place having the named entity, location information of the vehicle, or current time information.

3. The vehicle according to claim 2, wherein the processor is configured to correct the answer text stored in the database to include a phrase associated with a period between a time at which the named entity is set as the destination and an input time of the utterance command.

4. The vehicle according to claim 2, wherein the processor is configured to correct the answer text stored in the database to include a phrase associated with the category information of the named entity.

5. The vehicle according to claim 2, wherein when the vehicle is located within a preset distance from a first preset place and a place having the named entity corresponds to a second preset place, the processor is configured to correct the answer text stored in the database to include a preset phrase corresponding to the first preset place and the second preset place.

6. The vehicle according to claim 2, wherein the processor is configured to correct the answer text stored in the database to include a preset phrase corresponding to the current time information.

7. The vehicle according to claim 1, wherein when the domain is a mobile communication device and the named entity is a name indicating a family, the information corresponding to the domain and the named entity includes information on a plurality of modifiers for modifying the named entity, and wherein the processor is configured to correct the answer text stored in the database to include any one modifier among the plurality of modifiers.

8. A method for controlling a vehicle, the method comprising:
converting an utterance command of a user into text information;
recognizing a domain and a named entity corresponding to the utterance command based on the text information;
receiving information corresponding to the domain and the named entity;
correcting answer text stored in a database based on the information corresponding to the domain and the named entity;
controlling a speaker to output the corrected answer text; and
transmitting a control command corresponding to the utterance command to a control target device only when a condition for operating the control target device and weather information match or the condition and activation information of a vehicle system match, wherein correcting the answer text stored in the database based on the information corresponding to the domain and the named entity includes, when a number of times the named entity is set as a destination is increased, correcting the answer text stored in the database to include a phrase associated with the number of times, wherein correcting the answer text stored in the database based on the information corresponding to the domain and the named entity includes when a condition for operating the control target device and the weather information do not match or the condition and the activation information of the vehicle system do not match, correcting the answer text to be changed to an interrogative sentence including a first phrase associated with the weather information or a second phrase associated with the activation information of the vehicle system, and wherein transmitting a control command corresponding to the utterance command to the control target device only when a condition for operating the control target device and the weather information match or the condition and the activation information of the vehicle system match.

9. The method according to claim 8, wherein when the domain is a navigation device and the named entity is a place name, the information corresponding to the domain and the named entity includes at least one of destination setting history information for the named entity, category information of the named entity, location information of a place having the named entity, location information of the vehicle, or current time information.

10. The method according to claim 9, wherein correcting the answer text stored in the database based on the information corresponding to the domain and the named entity includes correcting the answer text stored in the database to include a phrase associated with a period between a time at which the named entity is set as the destination and an input time of the utterance command.

11. The method according to claim 9, wherein correcting the answer text stored in the database based on the information corresponding to the domain and the named entity includes correcting the answer text stored in the database to include a phrase associated with the category information of the named entity.

12. The method according to claim 9, wherein when the vehicle is located within a preset distance from a first preset place and a place having the named entity corresponds to a second preset place, correcting the answer text stored in the database based on the information corresponding to the domain and the named entity includes correcting the answer text stored in the database to include a preset phrase corresponding to the first preset place and the second preset place.

13. The method according to claim 9, wherein correcting the answer text stored in the database based on the information corresponding to the domain and the named entity includes correcting the answer text stored in the database to include a preset phrase corresponding to the current time information.

14. The method according to claim 8, wherein when the domain is a mobile communication device and the named entity is a name indicating a family, the information corresponding to the domain and the named entity includes information on a plurality of modifiers for modifying the named entity, and wherein correcting the answer text stored in the database based on the information corresponding to the domain and the named entity includes correcting the answer text stored in the database to include any one modifier among the plurality of modifiers.

\* \* \* \* \*